July 21, 1959
J. R. LONG
2,895,238
DUMP SCOOP
Filed June 6, 1957
2 Sheets-Sheet 1
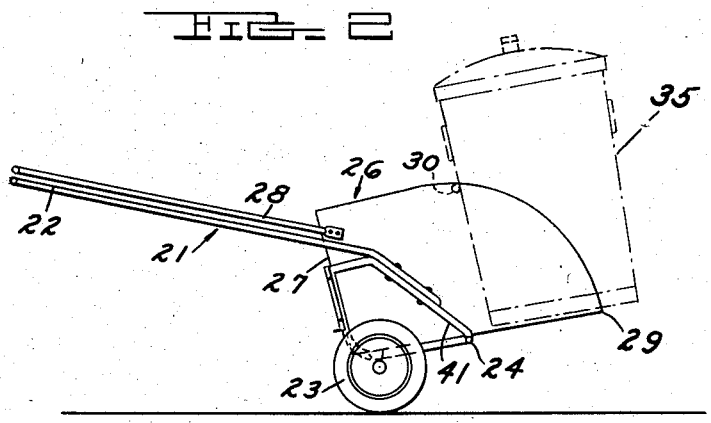
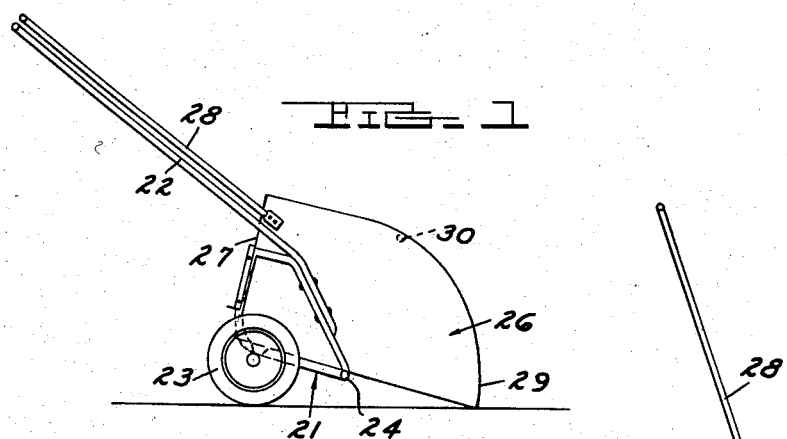
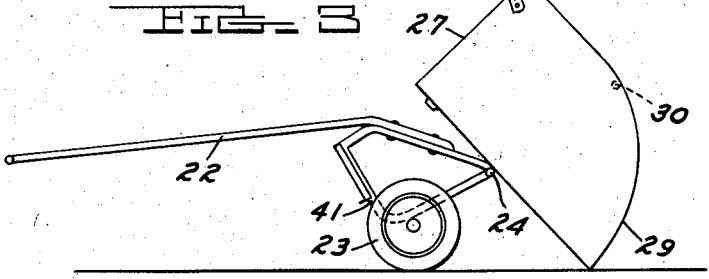
INVENTOR.
JOHN R. LONG
BY Farley, Forster & Farley
ATTORNEYS

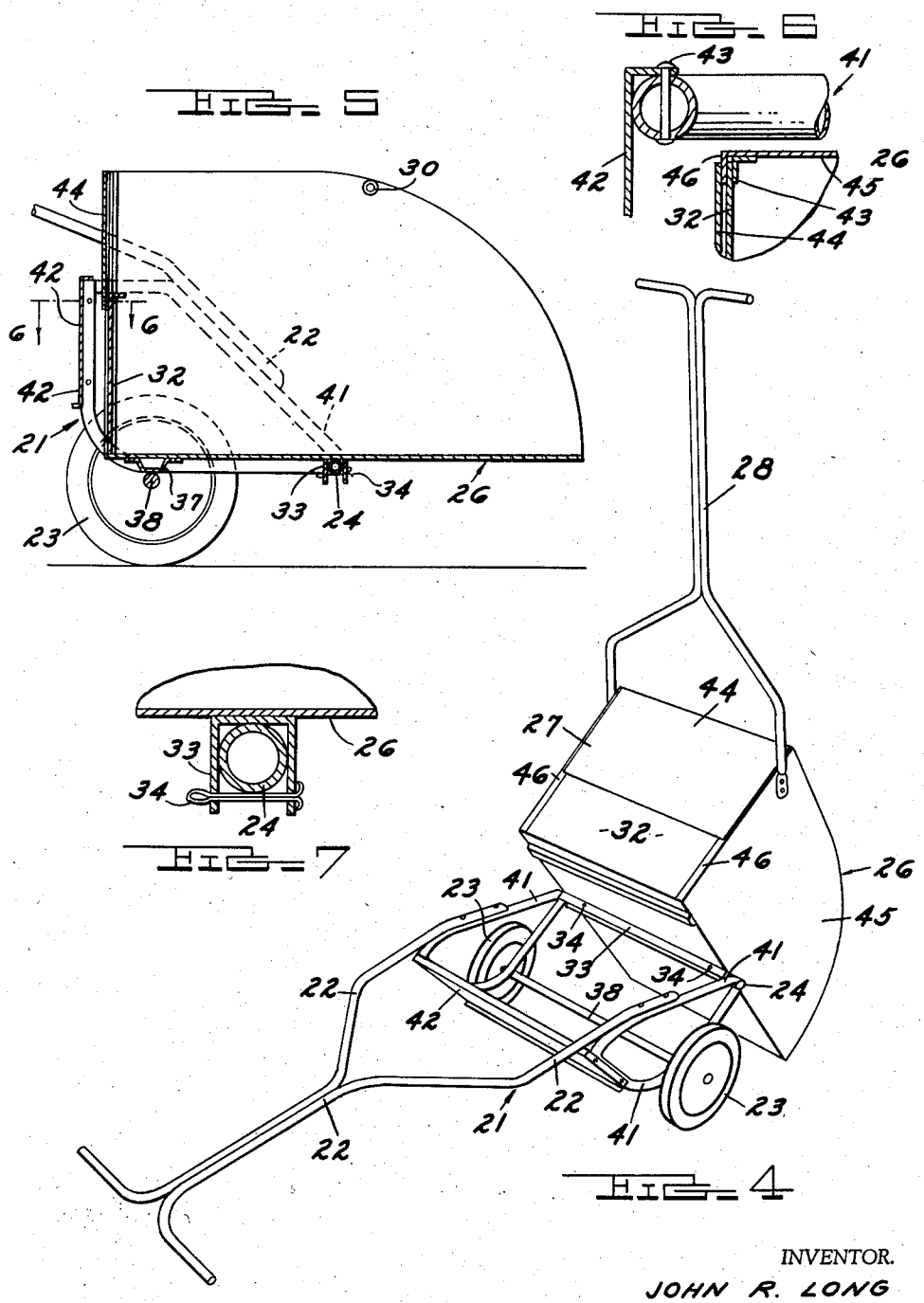

United States Patent Office 2,895,238
Patented July 21, 1959

2,895,238
DUMP SCOOP
John R. Long, Detroit, Mich.

Application June 6, 1957, Serial No. 663,932

3 Claims. (Cl. 37—130)

This invention pertains to a wheeled dump scoop which is capable of scooping and receiving material, adapted to carry such material, and finally, able to assume a dumping position for unloading the material. These operations are performed by a manually operated, relatively simple and inexpensive device which is particularly adapted to home and yard use.

With the device of this invention, a versatile home gardening and general maintenance carrier is provided. It is capable of acting as a scoop for snow, dirt, or refuse, and with a slight movement of the handle, acts as a wheelbarrow for transporting the scooped or loaded material to a desired unloading point. The device may then be operated in a dumping or unloading manner with a further movement of the handle.

These advantages are accomplished by a device which has a stand or frame pivoted to a pair of laterally spaced wheels and having a laterally disposed pivot bar placed forwardly of the wheels. The pivot bar is attached to a rearwardly extending handle and is swingable about the wheel axis by raising or lowering the handle. This stand assembly receives a scoop also having a rearwardly extending handle which is alignable with and overlying the first-mentioned handle. The scoop rests on the pivot bar which is positioned so that the rearward or closed end of the scoop will, during the scooping position, be sufficiently close to ground level so that the angle of contact between the open end of the scoop and the ground is suitable for scooping action. Heavier objects, such as trash cans and stones, may be pushed onto the scoop, eliminating any danger of lifting, which frequently causes an excessive strain on a person unused to it. The pivot bar may be advantageously placed in near vertical alignment with the center of gravity of a loaded scoop so that the unloading or dumping action may be more easily executed.

During the scooping or loading operation, the open end of the scoop rests on the ground while the two handles extend rearwardly in alignment. The handles at this point may advantageously be at a level so that the scoop may be manually pushed although it is within the scope of this invention to provide power-operated scoop wheels. After the scooping or loading has taken place, both handles are moved downwardly, lifting the scoop into position for conveying the loaded material. Unloading is accomplished simply and easily by moving the two handles apart—usually by moving the stand handle downwardly while the scoop handle is moved upwardly. This handle movement requires very little effort due to the leverage afforded by the handles and to the load balance provided, and the greater the relative separating movement between the handles, the more acute is the dumping attitude imparted to the scoop. The rearward or closed end of the scoop may have an adjustable baffle which would, when open, provide an opening for spreading the contents of the scoop as it is moved along the ground.

It is, therefore, an object of this invention to provide a conveying unit which is capable of scooping or receiving load material with a minimum of lifting. It is a further object to provide a device which may be moved to a conveying position after such loading. A still further object is to provide a device with means for pivoting the scoop container about its open end into a dumping position. Another object is to provide in such a container an adjustable baffle for spreading purposes.

These and other objects will become more apparent when a preferred embodiment is described in connection with drawings in which:

Fig. 1 is an elevational view showing the device in a scooping position;

Fig. 2 is an elevational view showing the device in a conveying position;

Fig. 3 is an elevational view showing the device in a dumping position;

Fig. 4 is a perspective view of the device in a dumping position;

Fig. 5 is a sectional view showing the scoop and the stand in more detail;

Fig. 6 is an enlarged section taken at 6—6 of Fig. 5; and

Fig. 7 is an enlarged view of the pivot bar connection to the floor panel of the scoop.

In Fig. 1 is shown stand 21 having a rearwardly extending handle 22, wheels 23, and forwardly located pivot bar 24.

As seen in Figs. 4 and 5, stand 21 comprises two laterally spaced triangular members 41 which are each attached to the forked handle 22. Members 41 are fixed to and separated by pivot bar 24, axle 38, and rear panel 42.

Located in stand 21 is a scoop 26 having closed end 27, rearwardly extending handle 28, open or scoop end 29, and support bar 30 which is attached to and may be adjustable along opposite side walls of the scoop. The scoop 26 may or may not be slidable along the pivot bar 24. However, in the embodiment shown, a channel 33 is fixed to the bottom of scoop 26 and pivot bar 24 is held in rotative relation to channel 33 by cotter pins 34 (Fig. 7). A bumper 37 is disposed laterally along the floor panel of scoop 26 and registers with axle 38 when the scoop is in an erect position as shown in Fig. 5.

An adjustable panel 32 is provided along the bottom edge of closed end 27 which, when opened or cracked the necessary degree and with scoop 26 tilted rearwardly as shown in a conveying position, Fig. 2, provides a spreader for seed, fertilizer, and the like. Fig. 6 shows the construction which allows baffle 32 to be adjustably moved along the rear wall 44 of scoop 26. As seen in Fig. 6, each side wall 45 has an inwardly turned end 46 which is longitudinally spaced from an angle strip 43 and rear wall 44 to provide a sliding clearance for baffle 32. Baffle 32 is frictionally engaged between the ends 46 and the rear wall 44 so that it will hold the position to which it is adjusted.

In Fig. 1 the scoop is shown in a loading or scooping position with the handles 22, 28 approximately chest high so that suitable force may be exerted by the operator to perform a scooping operation. An important feature aside from the scooping aspect, is that with the device in the position shown in Fig. 1, heavy objects which are not readily adapted to scooping may be loaded into scoop 26 with a minimum of effort. In the case of trash cans, or other large objects, support bar 30 helps to maintain the can in an erect position providing for a minimum of movement in loading and unloading. An upper portion of the can 35 (Fig. 2) abuts bar 30. In this manner the can will remain erect without the need for sliding it to the extreme rear of the scoop.

Once the scoop is loaded, the open end 29 may be lifted (Fig. 2) by depressing handles 22, 28 to permit a conveying or transporting of the device by a pushing or pulling movement on said handles. During the conveyance of the loaded material, due to the fact that the center of gravity of the scoop 26 may be ahead or forward of the wheels 23, there would be a lifting force on handles 22 and 28 which makes more comfortable the moving of the device.

When the unloading point has been reached, scoop 26 is tilted forwardly until the open end 29 rests on the ground. If a dumping action is desired, then handle 22 is moved downwardly while handle 28 is moved to a raised position (see Fig. 3). Since the pivot bar 24 is preferably near vertical alignment with the center of gravity of the scoop 26, moving of handle 28 to a raised position requires little effort and if the center of gravity is ahead of pivot bar 24 (as with the scoop loaded in the manner shown in Fig. 2), no effort at all is required. Dumping may then be performed by depressing handle 22 which again requires less effort since the weight of a person may be used to advantage in this downward movement.

The bottom edge of closed end 27 is close enough to the ground level during scooping so that the angle formed between the open end 29 and the ground is suitable for scooping operation. Pivot bar 24 is located a sufficient distance forwardly of wheel 23 so as to provide a suitable degree of tilt to the scoop 26 during a dumping action and, with the construction where bar 24 is slidable along the floor panel, the angle of scoop 26 may be increased once dumping has begun by simply moving stand 21 forwardly toward open end 29 while maintaining the depressed position of handle 22.

While a preferred embodiment of my invention has been described above in detail, it will be understood that numerous modifications may be resorted to without departing from the scope of the following claims.

I claim:

1. A carrying device comprising a container scoop, a stand for supporting said scoop, said stand having a pair of laterally spaced, axially aligned wheels mounted thereon, pivot means carried by said stand forwardly of said wheels, means for pivotally supporting said scoop on said pivot means, handle means secured to said stand and extending rearwardly and upwardly therefrom whereby said stand may be propelled and the elevation of said pivot means may be controlled relative to the elevation of the axis of said wheels, and second handle means secured to said scoop and extending rearwardly and upwardly therefrom whereby said scoop may be independently rocked about said pivot means.

2. A carrying device according to claim 1 further characterized by said second handle means overlying and being substantially coextensive with said first handle means.

3. A carrying device according to claim 2 further characterized by said first and second handle means being proportioned so that their ends are positioned adjacent each other whereby both of said handles may be simultaneously grasped by an operator to positively control the relative positions of said scoop and stand.

References Cited in the file of this patent

UNITED STATES PATENTS

| Re. 20,228 | Gulliver | Jan. 5, 1937 |
| 662,740 | Richardson | Nov. 27, 1900 |
| 1,473,572 | Fitzgerald | Nov. 6, 1923 |